(12) United States Patent
Harper (10) Patent No.: US 12,107,329 B2
(45) Date of Patent: Oct. 1, 2024

(54) ACTIVE ISOLATION ENHANCEMENT FOR MULTI-MODE ANTENNA SYSTEM

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 18/074,267

(22) Filed: Dec. 2, 2022

(65) Prior Publication Data

US 2024/0079770 A1 Mar. 7, 2024

Related U.S. Application Data

(60) Provisional application No. 63/374,445, filed on Sep. 2, 2022.

(51) Int. Cl.
*H01Q 1/52* (2006.01)
*H01Q 1/24* (2006.01)
*H01Q 5/335* (2015.01)

(52) U.S. Cl.
CPC ............. *H01Q 1/521* (2013.01); *H01Q 1/247* (2013.01); *H01Q 5/335* (2015.01)

(58) Field of Classification Search
None
See application file for complete search history.

(56) References Cited

U.S. PATENT DOCUMENTS

| | | |
|---|---|---|
| 6,920,315 B1 | 7/2005 | Wilcox et al. |
| 9,182,476 B2 | 11/2015 | Wintermantel |
| 9,728,848 B1 | 8/2017 | Sammeta et al. |
| 9,997,841 B2 | 6/2018 | Andujar Linares et al. |
| 10,916,841 B2 | 2/2021 | Ravichandran et al. |
| 2015/0116153 A1 | 4/2015 | Chen |

(Continued)

FOREIGN PATENT DOCUMENTS

CN 213212379 U 5/2021

(Continued)

OTHER PUBLICATIONS

International Search Report and Written Opinion received for PCT Application No. PCT/US23/027968, Nov. 9, 2023, 11 pages.

(Continued)

*Primary Examiner* — Wilson Lee
(74) *Attorney, Agent, or Firm* — Alleman Hall & Tuttle LLP (57) ABSTRACT

Examples are disclosed that relate to controlling an electronic device including a multi-mode antenna system. In a first operating mode, a radio signal is transmitted via a first antenna, a second antenna is actively de-tuned the while receiving a reflected radio signal thereby increasing isolation between the first and second antennas, an object is detected based at least on the reflected radio signal and the multi-mode antenna system is switched to operation in a second operating mode. In the second operating mode, a first remote radio signal transmitted by a remote antenna of a remote electronic device is received, via the first antenna, a second remote radio signal transmitted by the remote antenna is received via the second antenna, and a position of the remote electronic device is determined based at least on a phase difference between the first remote radio signal and the second remote radio signal.

20 Claims, 6 Drawing Sheets

(56) References Cited

U.S. PATENT DOCUMENTS

| | | | |
|---|---|---|---|
| 2016/0180125 A1* | 6/2016 | Schuster | H03H 7/38 |
| | | | 235/451 |
| 2018/0159222 A1* | 6/2018 | Backes | H03H 7/40 |
| 2019/0252800 A1* | 8/2019 | Yetisir | H01Q 19/10 |
| 2019/0319352 A1* | 10/2019 | Gonzalez | H01Q 1/521 |
| 2019/0383898 A1 | 12/2019 | Alidio | |
| 2021/0083364 A1* | 3/2021 | Svendsen | H01Q 25/00 |
| 2021/0373112 A1 | 12/2021 | Tertinek | |
| 2022/0244374 A1 | 8/2022 | Soltanaghaei | |

OTHER PUBLICATIONS

Rajkumar, et al., "Isolation Improvement of UWB MIMO Antenna Utilising Molecule Fractal Structure", In Journal of Electronics Letters, vol. 55, Issue 10, May 1, 2019, pp. 576-579.

\* cited by examiner

ACTIVE ISOLATION ENHANCEMENT FOR MULTI-MODE ANTENNA SYSTEM

CROSS REFERENCE TO RELATED APPLICATIONS

This application claims priority to U.S. Patent Application Ser. No. 63/374,445, filed Sep. 2, 2022, the entirety of which is hereby incorporated herein by reference for all purposes.

BACKGROUND

An electronic device can include one or more antenna systems that provide various functionality. As one example, an electronic device can include an antenna system that provides radio detection and ranging (RADAR) functionality. As another example, an electronic device can include an antenna system that provides phase difference on arrival (PDOA) functionality to determine a position of an object in two dimensions (e.g., X, Y coordinates) relative to the electronic device. In some examples, the object may include a remote electronic device, such as a smartphone, a wearable device, a laptop computer, or another form of electronic device.

SUMMARY

Examples are disclosed that relate to controlling an electronic device including a multi-mode antenna system including a first antenna and a second antenna. The multi-mode antenna system is switchable between a first operating mode and a second. In the first operating mode, a radio signal is transmitted via the first antenna, the second antenna is actively de-tuned while receiving a reflected radio signal thereby increasing isolation between the first and second antennas, a presence of an object is detected based at least on the reflected radio signal received by the second antenna, and based at least on detecting the presence of the object, the multi-mode antenna system is switched to operation in the second operating mode. In the second operating mode, a first remote radio signal transmitted by a remote antenna of a remote electronic device is received via the first antenna, a second remote radio signal transmitted by the remote antenna of the remote electronic device is received via the second antenna, and a position of the remote electronic device is determined based at least on a phase difference between the first remote radio signal received by the first antenna and the second remote radio signal received by the second antenna.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An electronic device can include one or more antenna systems that provide various functionality. In some examples, an electronic device includes an antenna system that provides radio detection and ranging (RADAR) functionality. In one example, the antenna system includes a transmission antenna that emits electromagnetic radiation in the form of radio signals. When the radio signals contact an object, at least some of the radio signals are reflected back to a receiving antenna of the antenna system. The antenna system detects the object based at least on the radio signals that are received by the receiving antenna. In some examples, the antenna system determines a distance between the electronic device and the detected object based at least on the radio signals emitted by the transmission antenna and the reflected radio signals received by the receiving antenna.

In some examples, an electronic device includes an antenna system that provides phase difference on arrival (PDOA) functionality to determine a position of an object in two dimensions (e.g., X, Y coordinates) relative to the electronic device. In one example, the antenna system includes two separate receiving antennas that receive radio signals emitted from an antenna system of a remote electronic device associated with an object. The remote electronic device can take any suitable form, such as a smartphone, a wearable device, a laptop computer, or another form of electronic device. The antenna system determines a position of the remote electronic device based at least on a phase difference of arrival of the radio signals received by the two separate receiving antennas and the distance between the two separate receiving antennas.

In some examples, an electronic device includes a multi-mode antenna system that switches between a RADAR mode of operation to detect the presence of an object and a PDOA mode of operation to determine a position of the detected object relative to the electronic device. The multi-mode antenna system includes one or more antennas that switch between operating as a transmission antenna and a receiving antenna depending on the mode of operation of the multi-mode antenna system. The multi-mode antenna system provides the technical benefit of reducing a physical footprint relative to an antenna system that includes separate sets of antennas that provide separate RADAR and PDOA functionality.

However, such a multi-mode antenna system has some conflicting requirements to achieve suitable operation in each of the RADAR and PDOA operating modes. As one example, for operation in the PDOA operating mode, the receiving antennas have to be within a threshold separation distance of each other to inhibit signal aliasing that reduces position measurement accuracy. The threshold distance is based at least on the wavelength of the radio signals received by the antennas.

In some examples, the multi-mode antenna system employs ultra-wide band (UWB) radio-based communication technology for short-range use (e.g., line of sight use). An UWB antenna system consumes very little energy with fast/stable data transmission and high measurement precision relative to other types of radio-based communication technologies. The wavelength of UWB radio signals is relatively small relative to the other radio-based communication technologies. The wavelength of the UWB radio signals requires the threshold separation distance between the two receiving antennas to be relatively small.

The relatively small separation distance between the antennas results in signal noise being generated when the multi-mode antenna system operates in a standard RADAR mode of operation where one antenna is transmitting, and another antenna is receiving. Such signal noise reduces a signal-to-noise ratio (SNR) of the received radio signal and correspondingly reduces detection/distance measurement accuracy, especially at longer detection distances where a received signal-level is relatively lower. In a standalone RADAR scenario, the separation distance between the antennas could be increased to increase signal isolation and reduce signal noise. However, in the multi-mode scenario, increasing the separation distance between the antennas beyond the threshold separation distance would significantly reduce performance of the multi-mode antenna system while operating in the PDOA operating mode.

Accordingly, the present description is directed to an approach for controlling a multi-mode antenna system to actively enhance signal isolation during operation in the RADAR operating mode while maintaining the threshold separation distance suitable for operation in the PDOA operating mode. Specifically, the approach includes actively de-tuning the transmission antenna while operating in the RADAR operating mode, so that the transmission and receiving antennas are not so tightly coupled and isolation is increased relative to when the transmission and receiving antennas are impedance matched. Such de-tuning and resulting increased isolation provide the technical benefit of increasing the SNR of the received radio signals that increases detection accuracy. Additionally, such de-tuning provides the technical benefit of allowing for transmission power to be increased and receiving gain to be increased while operating in the RADAR operating mode without compromising performance during operation in the PDOA operating mode.

Figure 1A:
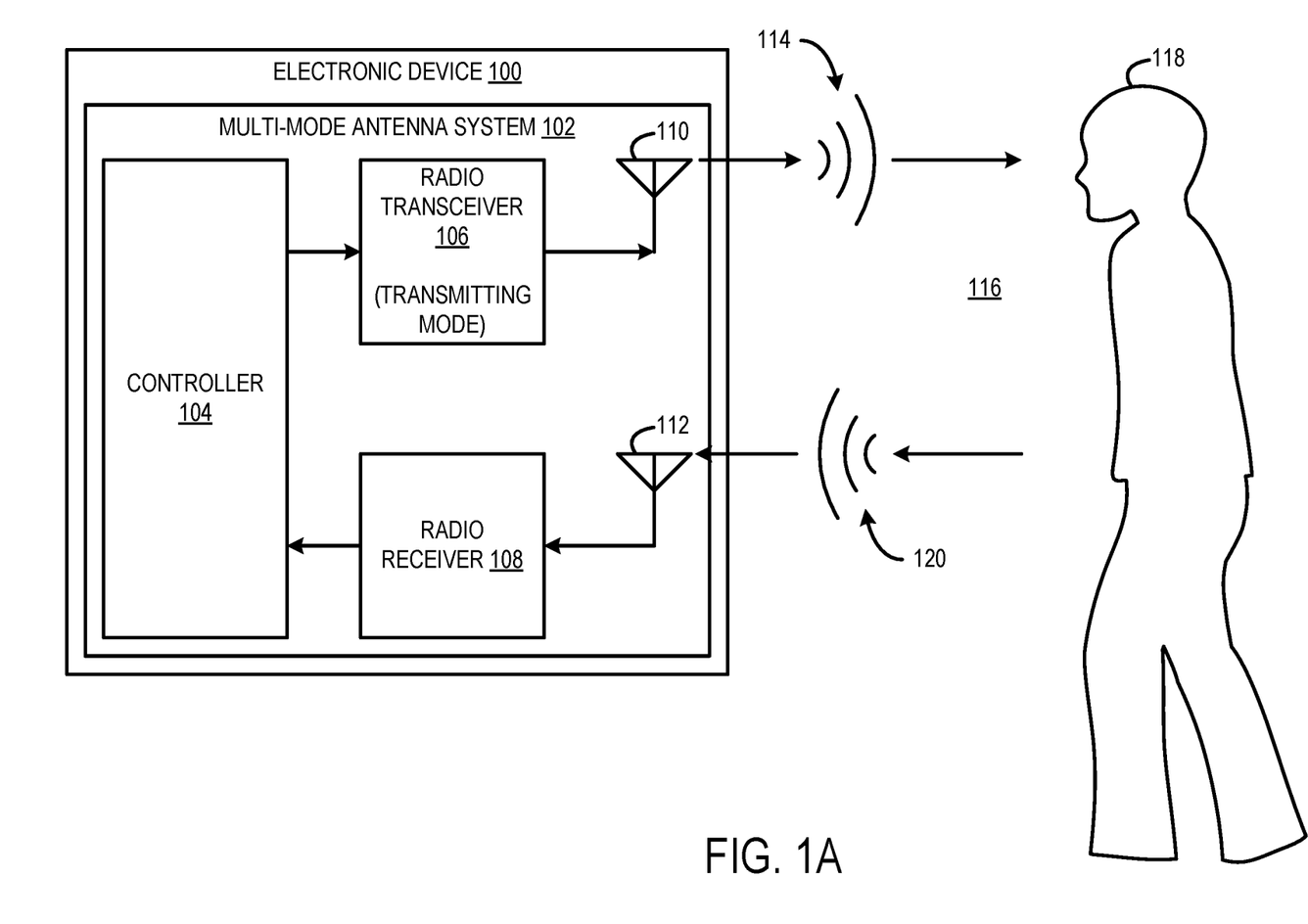
FIG. 1A shows an example multi-mode antenna system of an electronic device operating in a RADAR mode.
Figure 1B:
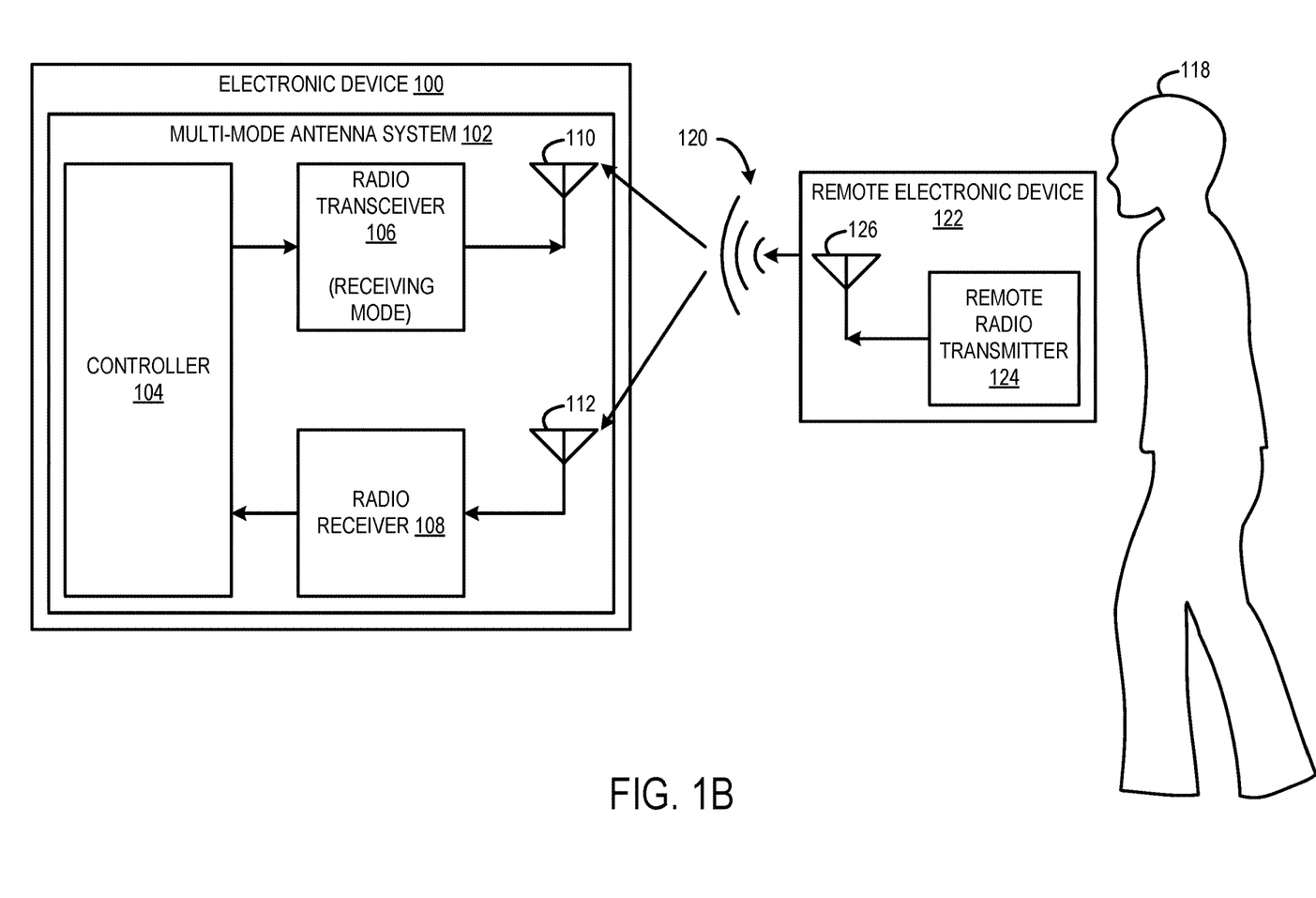
FIG. 1B shows the example multi-mode antenna system of FIG. 1A operating in a phase difference on arrival (PDOA) mode.

FIGS. 1A and 1B show an example electronic device 100 including a multi-mode antenna system 102. The multi-mode antenna system 102 includes a controller 104 that controls operation of a radio transceiver 106 and a radio receiver 108. The radio transceiver 106 is electrically connected to a first antenna 110. The radio transceiver 106 is switchable between operating as a radio transmitter or a radio receiver depending on the mode of operation of the multi-mode antenna system 102. The radio receiver 108 is electrically connected to a second antenna 112. The first antenna 110 is spaced apart from the second antenna 112 by a separation distance that is based at least on a wavelength of radio signals transmitted/received by the multi-mode antenna system 102.

In some implementations, the multi-mode antenna system 102 is a UWB antenna system that employs UWB-radio based communication technology. In such examples, the separation distance between the first antenna 110 and the second antenna 112 is based at least on a wavelength of the UWB radio signal of the UWB antenna system.

In FIG. 1A, the multi-mode antenna system 102 operates in the RADAR operating mode. The controller 104 sends the radio transceiver 106 frequency and timing data. The radio transceiver 106 operates in a transmitting mode in which the radio transceiver 106 generates a radio signal based at least on the frequency and timing data received from the controller 104. In one example, the radio signal is a modulated radio signal including a plurality of signal pulses generated based at least on a frequency of interest. The radio transceiver 106 drives the first antenna 110 with the radio signal and the first antenna 110 transmits the radio signal 114 into the environment 116. The transmitted radio signal 114 reflects off an object in in the environment 116. In the illustrated example, the object is a human subject 118. A reflected radio signal 120 is reflected off the human subject 118 and directed toward the electronic device 100.

The controller 104 actively de-tunes the second antenna 112 such that isolation between the first antenna 110 and the second antenna 112 is increased to a suitable level for the second antenna 112 to gather the reflected radio signal 120 and for the radio receiver 108 to detect the reflected radio signal 120 with a suitably high SNR.

In some implementations, the controller 104 actively de-tunes the second antenna 112 by changing an impedance of the second antenna 112 such that it does not match the frequency of interest (e.g., the frequency of the radio signal 114). Such a mismatch in impedance correspondingly increases the isolation between the first antenna 110 and the second antenna 112. The controller 104 changes the impedance of the second antenna 112 to be mismatched while being within a tolerance level for the radio receiver 108 to still detect the reflected radio signal 120.

In some implementations, the controller 104 actively de-tunes the second antenna 112 by loading the second antenna 112 with a resistor. The additional resistance artificially reduces the efficiency of the second antenna 112 so that the second antenna 112 does not radiate as much relative to an unloaded state. Such reduced efficiency correspondingly increases the isolation between the first antenna 110 and the second antenna 112.

In some implementations, the controller 104 de-tunes the second antenna 112 on a time switching basis. For example, the controller 104 may de-tune the second antenna 112 synchronously with a pulse frequency of the reflected radio signal 120. In some implementations, the controller de-tunes the second antenna 112 for some or all of a transmission cycle in which the first antenna 110 transmits the radio signal 114.

The increased isolation between the first and second antennas provided by the active de-tuning of the second antenna allows for various control adjustments to be made to improve operation of the antenna system 102. In some examples, the controller 104 increases a power level at which the radio transceiver 106 drives the first antenna 110 with the radio signal and the first antenna 110 transmits the radio signal 114 relative to a power level of an antenna system that does not perform active de-tuning. In some examples, the controller 104 increases a receiving gain at which the reflected radio signal is received by the second antenna 112 relative to a receiving gain of an antenna system that does not perform active de-tuning.

The controller 104 performs various signal/data processing based at least on the reflected radio signal 120. In one example, the controller 104 detects the presence of the human subject 118 based at least on the reflected radio signal 120. In some examples, the controller 104 performs additional computing operations to effect control of the electronic device 100. In one example, the controller 104 switches from operation in the RADAR operating mode to operation in the PDOA operating mode based at least on detecting the presence of the human subject 118.

In FIG. 1B, the multi-mode antenna system 102 operates in the PDOA operating mode. In the PDOA operating mode, both the radio transceiver 106 and the radio receiver 108 operate in a receiving mode to detect a remote radio signal 120 emitted from a remote electronic device 122 associated with the detected human subject 118. The remote electronic device 122 includes a remote radio transmitter 124 that generates the remote radio signal 120. The remote radio transceiver 124 drives a remote antenna 126 with the remote radio signal 120 and the remote antenna 126 transmits the remote radio signal 120 toward the electronic device 100. In the PDOA operating mode, the controller 104 tunes the first antenna 110 and the second antenna 112 to match the frequency of the remote radio signal 120. In other words, since both antennas 110, 112 are operating as receiving antennas in the PDOA operating mode, there is no need to increase isolation between the antennas by actively de-tuning either one of the antennas 110, 112.

The controller 104 determines a position of the remote electronic device 122 based at least on a phase difference between the remote radio signal received by the first antenna 110 and the remote radio signal received by the second antenna 112. In some examples, the determined position of the remote electronic device 122 is a two-dimensional position (e.g., X, Y coordinates) defined relative to a position of the electronic device 100. Using the phase difference between the radio signals received between the first and second antennas to determine the position of the remote electronic device provides the technical benefit of increasing position accuracy relative to other position determination approaches, such as RADAR that merely detects presence.

In some examples, the controller 100 performs various computing operations based at least on the determined position of the remote electronic device 122. In one example, the controller 104 determines whether the human subject 118 is in close enough proximity to interact with the electronic device 100 and performs various computing operations based at least on said determination. In one example, the controller 104 performs a user authentication operation by communicating with the remote electronic device 122 based at least on determining that the remote electronic device 122 is in proximity to the electronic device 100. The controller 104 may perform any suitable computing operations based at least on determining the position of the remote electronic device 122 while operating in the PDOA operating mode.

The electronic device 100 shown in FIGS. 1A and 1B is provided as a non-limiting example. The electronic device 100 may take any suitable form including but not limited to a desktop computer, a laptop computer, a tablet computer, a gaming console, a mobile computing device, a smartphone, a wearable computing device, an augmented or mixed reality computing device, an Internet of Things (JOT) computing device, or another type of computing device. In some examples, the electronic device 100 includes more than two antennas, so that more than just distance can be resolved (e.g., a 2D/3D position of an external transmitting antenna or object reflecting signals). In some examples, the electronic device 100 includes an antenna array including a plurality of transmitting and receiving antennas. In some examples, the electronic device 100 includes two or more antennas that switch between transmitting in the RADAR operating mode and receiving in the PDOA operating mode. The electronic device 100 may include any suitable number of radio transceivers, transmitters, receivers, and/or antennas.

Figure 2:
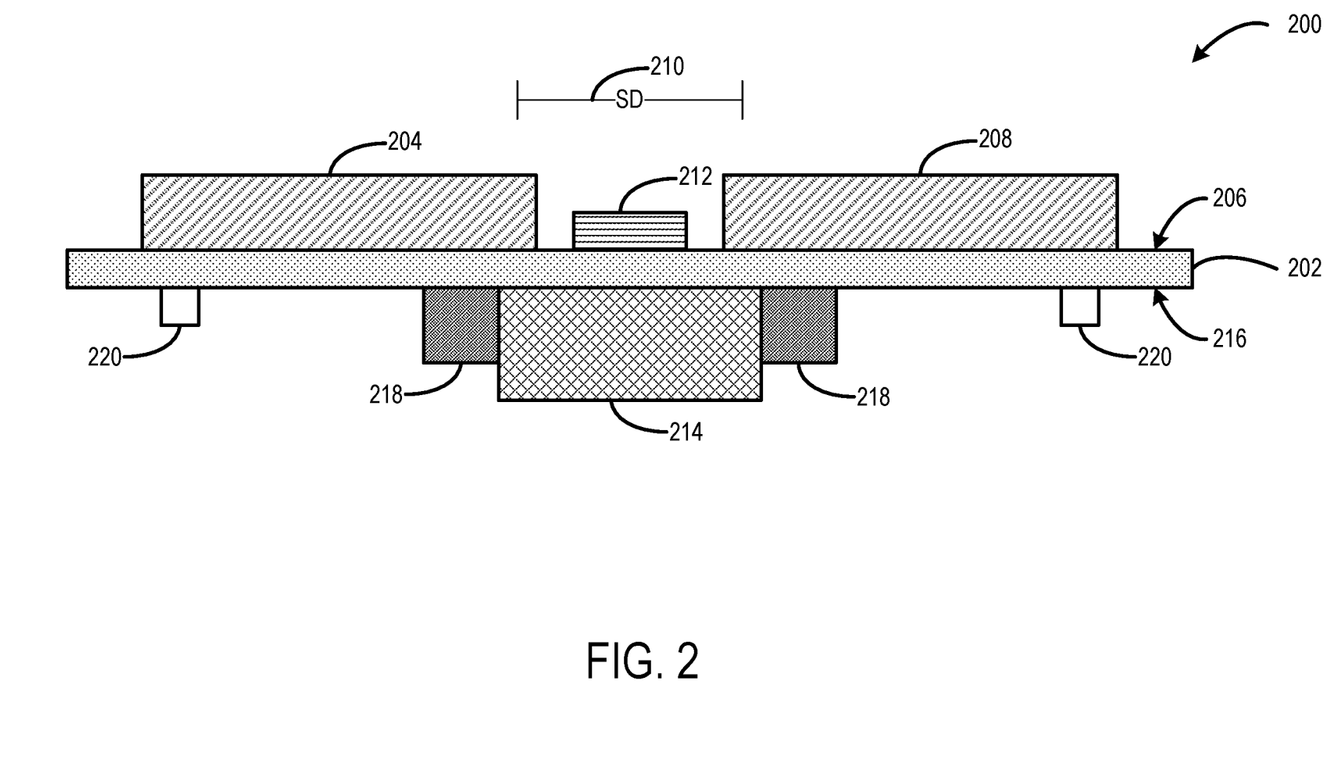
FIG. 2 shows an integrated circuit (IC) level diagram of an example multi-mode antenna module.

FIG. 2 shows an integrated circuit (IC) level diagram of an example multi-mode antenna module 200. For example, the multi-mode antenna module 200 may correspond to the multi-mode antenna system 102 shown in FIGS. 1A and 1B. The multi-mode antenna module 200 includes a printed circuit board 202. A first antenna 204 is mounted on a first side 206 of the printed circuit board 202. For example, the first antenna 204 may correspond to the first antenna 110 shown in FIGS. 1A and 1B. A second antenna 208 is mounted on the first side 206 of the printed circuit board 202. For example, the second antenna 208 may correspond to the second antenna 112 shown in FIGS. 1A and 1B.

The second antenna 208 is spaced away from the first antenna 204 by a separation distance (SD) 210. In the illustrated example, the multi-mode antenna IC module 200 employs UWB antennas have a spacing requirement (e.g., ½ the wavelength of interest) of eighteen (18) millimeters. So, the first and second antennas 204, 208 are spaced apart eighteen (18) millimeters on the printed circuit board 202. Such a spacing requirement provides the technical benefit of reducing or eliminating signal aliasing that increases position measurement accuracy of the multi-mode antenna module 200. In other examples, the first and second antennas 204, 208 are spaced apart by a different separation distance that is wavelength dependent.

A secure element IC 212 is mounted on the first side 206 of the printed circuit board 202 in between the first and second antennas 204, 208. The secure element IC 212 communicates with a remote electronic device (e.g., the remote electronic device 122 shown in FIG. 1B) to perform a user authentication operation to identify a user associated with the remote electronic device.

A system in package (SIP) module 214 is mounted on a second side 216 of the printed circuit board 202. For example, the SIP module 214 may correspond to the controller 104 shown in FIGS. 1A and 1B. The SIP module 214 controls operation of the first and second antennas 204, 208. In particular, the SIP module 214 switches operation between the RADAR operating mode and the PDOA operating mode. The SIP module 214 further de-tunes the second antenna 208 while operating in the RADAR operating mode to increase isolation between the first and second antenna. Such increased isolation between the first and second antennas provides the technical benefit of increasing SNR of the received radio signal and correspondingly increasing accuracy of presence detection performed by the SIP module 214.

A power connector 218 is mounted on the second side 216 of the printed circuit board 202. The power connector 218 provides electrical power to the SIP 214, the secure element IC 212, and the first and second antennas 204, 208. Radio frequency (RF) connectors 220 are mounted on the second side 216 of the printed circuit board 202. The RF connectors 220 provide calibration for the first and second antennas 204, 206.

The multi-mode antenna module 200 is provided as a non-limiting example. The multi-mode antenna module 200 is shown in simplified form for ease of understanding. In other examples, the multi-mode antenna module 200 includes additional components (e.g., additional antennas) and/or a different arrangement.

Figure 3:
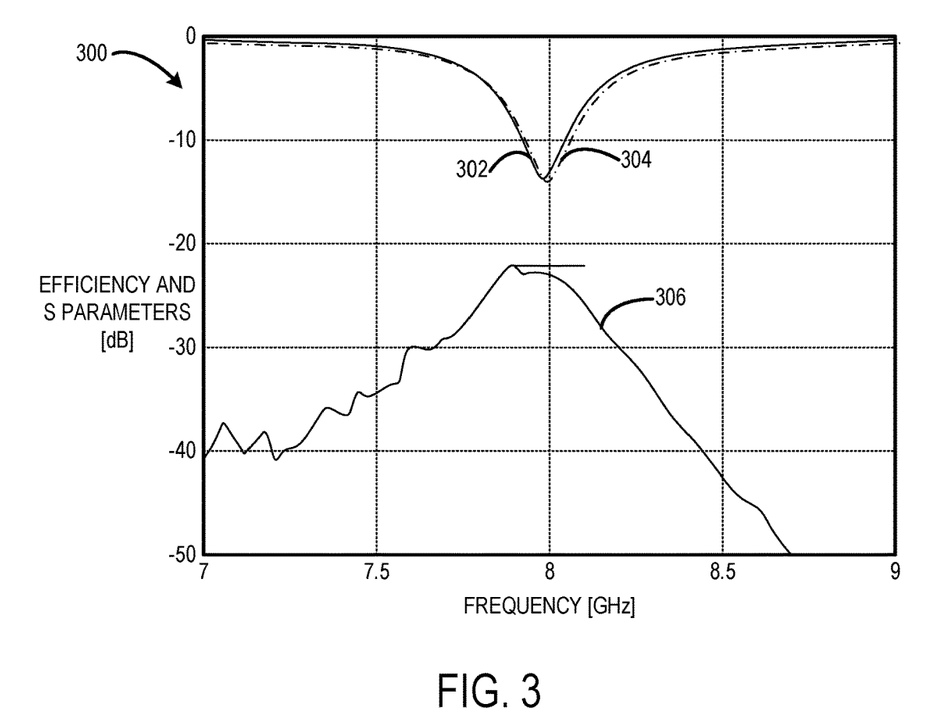
FIG. 3 shows a graph indicating operation characteristics of a multi-mode antenna system where antennas are tuned to match a frequency of interest.

FIG. 3 shows a graph 300 showing operation characteristics of a multi-mode antenna system where antennas are tuned to match a frequency of interest. A first waveform 302

(indicated by a solid line) corresponds to an impedance of a first antenna. A second waveform 304 (indicated by a dot-dashed line) corresponds to an impedance of a second antenna. In this example, both the first and second antennas are tuned such that the impedances of the first and second waveforms 302, 304 have a center frequency of approximately eight (8) Gigahertz at negative twelve (−12) dB. Further, the graph 300 includes a plot 306 of efficiency and S-parameters that indicate isolation between the first antenna and the second antenna. In the illustrated example, the plot 306 indicates that the first and second antennas have an isolation level of approximately negative twenty (−20) dB when both the first and second antennas are tuned to the frequency of interest. This level of isolation is suitable for operation in the PDOA operating mode. However, this level of isolation is not suitable for operation in the RADAR operating mode, because this level of isolation produces a radio signal having low SNR that reduces presence detection range and accuracy.

Figure 4:
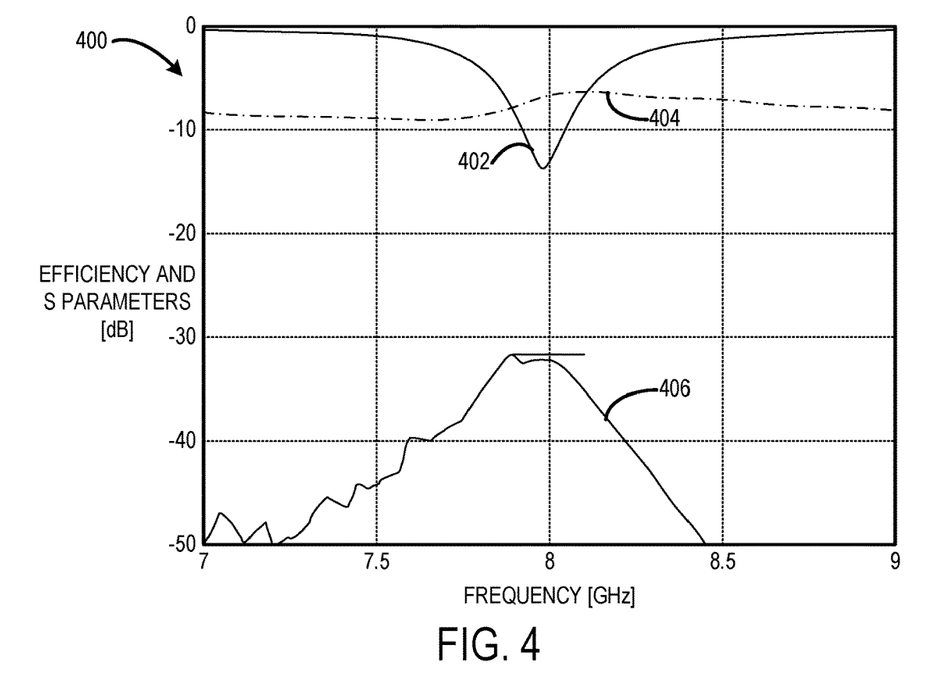
FIG. 4 shows a graph indicating operation characteristics of a multi-mode antenna system where an antenna is actively de-tuned to increase isolation between antennas.

FIG. 4 shows a graph 400 showing operation characteristics of a multi-mode antenna system where an antenna is actively de-tuned to increase isolation between antennas. A first waveform 402 (indicated by a solid line) corresponds to an impedance of a first antenna. A second waveform 404 (indicated by a dot-dashed line) corresponds to an impedance of a second antenna. In this example, the first antenna is tuned such that the first waveform 402 has a center frequency aligned with a frequency of interest of approximately eight (8) Gigahertz at negative (−12) db. The second antenna is actively de-tuned such that the impedance of the second antenna does not match the impedance of the first antenna. In particular, the second waveform 404 does not have a peak frequency at eight (8) Gigahertz at negative (−12) dB, and instead stays close to negative eight (−8). Further, the graph 400 includes a plot 406 of efficiency and S-parameters that indicate isolation between the first antenna and the second antenna. In the illustrated example, the plot 406 indicates that the first and second antennas have an isolation level of approximately negative thirty-two (−32) dB when the second antenna is actively de-tuned away from the frequency of interest. Such enhanced isolation produces a radio signal having high SNR that increases presence detection range and accuracy in RADAR mode relative to operation where both antennas are tuned to the frequency of interest.

Figure 5:
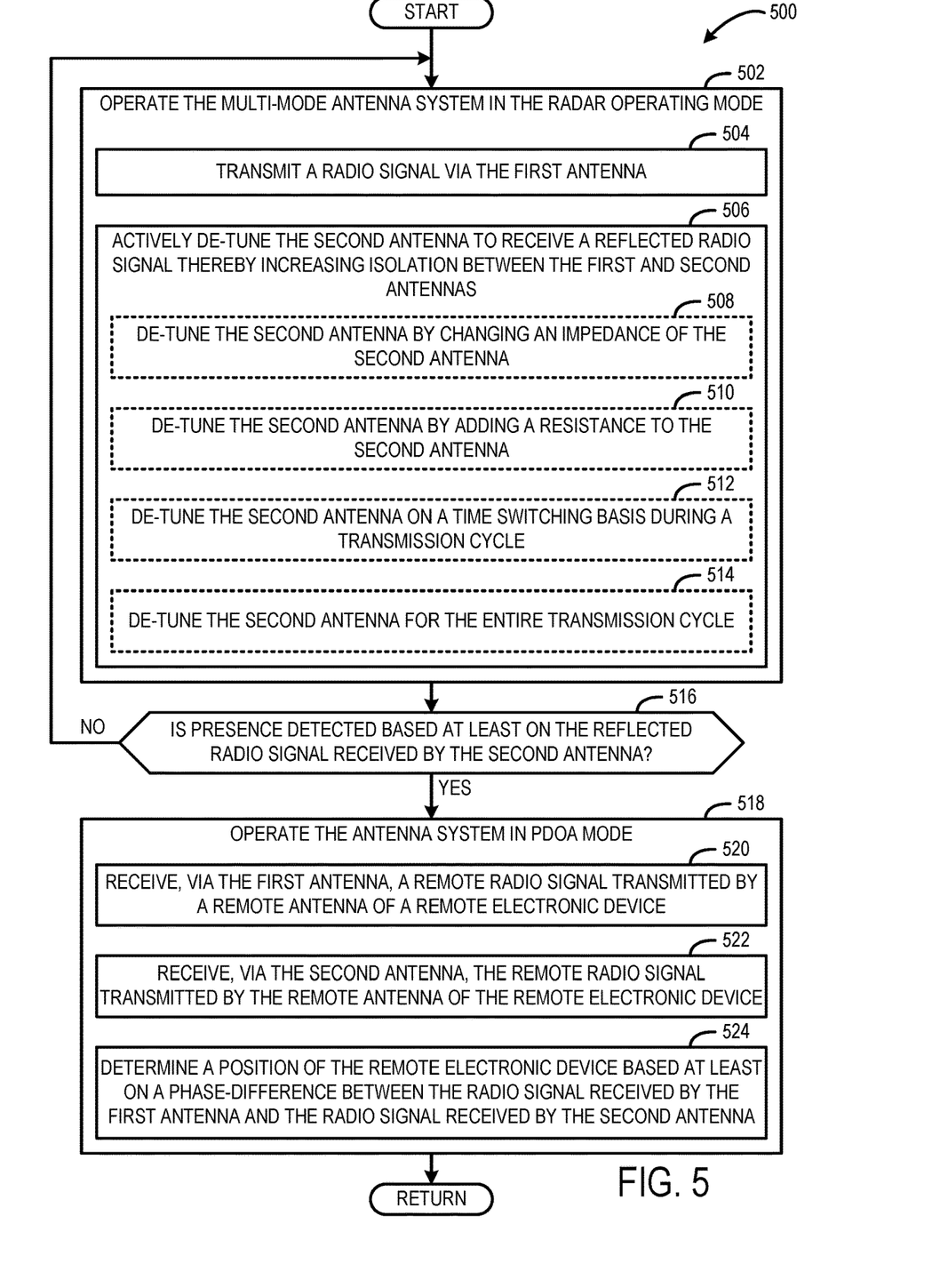
FIG. 5 shows an example method for controlling a multi-mode antenna system to provide selective active isolation enhancement.

FIG. 5 shows an example method 500 for controlling a multi-mode antenna system to provide selective active isolation enhancement. The multi-mode antenna system includes a first antenna and a second antenna. In some examples, the method 500 is performed by the controller 104 shown in FIGS. 1A and 1B and/or the SIP 214 shown in FIG. 2.

At 502, the method 500 includes operating the multi-mode antenna system in a RADAR operating mode. At 504, the method 500 includes transmitting a radio signal via the first antenna of the multi-mode antenna system. At 506, the method 500 includes actively de-tuning the second antenna to receive a reflected radio signal thereby increasing isolation between the first and second antennas.

In some implementations, at 508, the method 500 includes de-tuning the second antenna by changing an impedance of the second antenna. In some implementations, at 510, the method 500 includes de-tuning the second antenna by adding a resistance to the second antenna. In some implementations, at 512, the method 500 includes de-tuning the second antenna on a time switching basis during a transmission cycle in which the first antenna transmits the radio signal. For example, the second antenna can be de-tuned synchronously with the pulses of the radio signal transmitted by the first antenna. In some implementations, at 414, the method 500 includes de-tuning the second antenna for the entire transmission cycle in which the first antenna transmits the radio signal. The pulsed de-tuning approach provides the technical benefit of increased transmission accuracy at the cost of increased power consumption relative to the approach in which the second antenna is de-tuned for the entire transmission cycle. Conversely, the approach in which the second antenna is de-tuned for the entire transmission cycle provides the technical benefit of reduced power consumption at the cost of reduced transmission accuracy relative to the pulsed de-tuning approach.

In some implementations, a power level at which the first antenna transmits the radio signal is increased relative to a power level of an antenna system that does not perform active de-tuning. In some implementations, a receiving gain at which the reflected radio signal is received by the second antenna is increased relative to a receiving gain of an antenna system that does not perform active de-tuning. Such increases in transmission power level and receiving gain may be facilitated by the increased isolation between the first and second antennas provided by the active de-tuning of the second antenna during operation in the RADAR operating mode.

At 516, the method 500 includes determining if a presence of an object is detected based at least on the reflected radio signal received by the second antenna. In one example, the object that is detected is a human subject. If a presence is detected, then the method 500 moves to 518 and the multi-mode antenna system switches to operating in the PDOA operating mode. Otherwise, the method 500 returns to 502 and the multi-mode antenna system continues operating in the RADAR operating mode.

At 520, the method 500 includes receiving, via the first antenna, a first remote radio signal transmitted by a remote antenna of a remote electronic device.

At 522, the method 500 includes receiving, via the second antenna, a second remote radio signal transmitted by the remote antenna of the remote electronic device.

At 524, the method 500 includes determining a position of the electronic device based at least on a phase difference between the first remote radio signal received by the first antenna and the second remote radio signal received by the second antenna.

The above-described method can be performed to selectively actively de-tune the second antenna while operating in the RADAR operating mode so that the transmission and receiving antennas are not so tightly coupled and isolation between the antennas is enhanced. By enhancing isolation in this manner, the transmission power can be increased and also the receiving gain can be increased without compromising the other benefits of UWB such as PDOA functionality.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
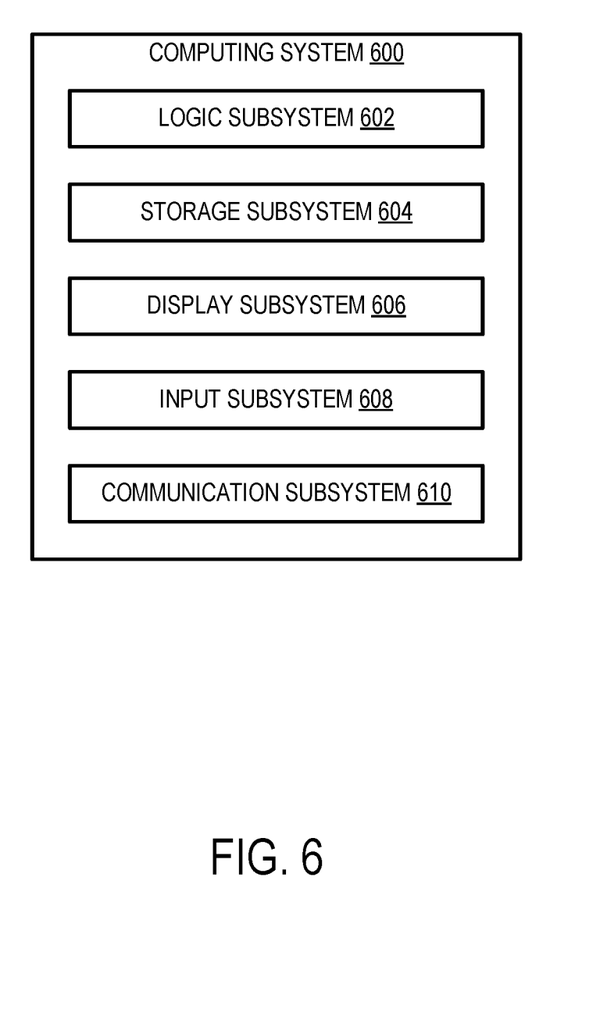
FIG. 6 shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. As one example, the computing system 600 is representative of the electronic device 100 shown in FIGS. 1A and 1B.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

In an example, a method for controlling an electronic device including a multi-mode antenna system including a first antenna and a second antenna, and the multi-mode antenna system being switchable between a first operating mode and a second operating mode, comprises in the first operating mode, transmitting a radio signal via the first antenna, actively de-tuning the second antenna while receiving a reflected radio signal thereby increasing isolation between the first and second antennas, detecting a presence of an object based at least on the reflected radio signal received by the second antenna, based at least on detecting the presence of the object, switching the multi-mode antenna system to operation in the second operating mode, in the second operating mode, receiving, via the first antenna, a first remote radio signal transmitted by a remote antenna of a remote electronic device, receiving, via the second antenna, a second remote radio signal transmitted by the remote antenna of the remote electronic device, and determining a position of the remote electronic device based at least on a phase difference between the first remote radio signal received by the first antenna and the second remote radio signal received by the second antenna. In this example and/or other examples, actively de-tuning the second antenna may include changing an impedance of the second antenna. In this example and/or other examples, actively de-tuning the second antenna may include adding a resistance to the second antenna. In this example and/or other examples, the second antenna may be actively de-tuned on a time switching basis during a transmission cycle in which the first antenna transmits the radio signal. In this example and/or other examples, the second antenna may be actively de-tuned synchronously with a pulse frequency of the radio signal transmitted by the first antenna. In this example and/or other examples, the second antenna may be actively de-tuned for an entire transmission cycle in which the first antenna transmits the radio signal. In this example and/or other examples, the first operating mode may be a radio detection and ranging (RADAR) mode of operation. In this example and/or other examples, the second operating mode may be a phase difference on arrival (PDOA) mode of operation.

In another example, an electronic device comprises a multi-mode antenna system including a first antenna and a second antenna, and a controller configured to in a first operating mode of the multi-mode antenna system, transmit a radio signal via the first antenna, actively de-tune the second antenna while receiving a reflected radio signal thereby increasing isolation between the first and second antennas, detect a presence of an object based at least on the reflected radio signal received by the second antenna, and based at least on detecting the presence of the object, switching the multi-mode antenna system to operation in a second operating mode, and in the second operating mode of the multi-mode antenna system, receive, via the first antenna, a first remote radio signal transmitted by a remote antenna of a remote electronic device, receive, via the second antenna, a second remote radio signal transmitted by the remote antenna of the remote electronic device, and determine a position of the remote electronic device based at least on a phase difference between the first remote radio signal received by the first antenna and the second remote radio signal received by the second antenna. In this example and/or other examples, actively de-tuning the second antenna may include changing an impedance of the second antenna. In this example and/or other examples, actively de-tuning the second antenna may include adding a resistance to the second antenna. In this example and/or other examples, the second antenna may be actively de-tuned on a time switching basis during a transmission cycle in which the first antenna transmits the radio signal. In this example and/or other examples, the second antenna may be actively de-tuned synchronously with a pulse frequency of the radio signal transmitted by the first antenna. In this example and/or other examples, the second antenna may be actively de-tuned for an entire transmission cycle in which the first antenna transmits the radio signal. In this example and/or other examples, the first operating mode may be a radio detection and ranging (RADAR) mode of operation. In this example and/or other examples, the second operating mode may be a phase difference on arrival (PDOA) mode of operation. In this example and/or other examples, the multi-mode antenna system may comprise an integrated circuit (IC) module including a printed circuit board (PCB), the first and second antennas may be ultra-wide band (UWB) antennas, and the first and second UWB antennas may be spaced apart on the PCB by a separation distance that is dependent on the wavelength of the radio signals transmitted by the first and second UWB antennas. In this example and/or other examples, the controller may increase a transmission power at which the radio signal is transmitted via the first antenna relative to a corresponding antenna system that does not actively de-tune the second antenna. In this example and/or other examples, the controller may increase a receiving gain at which the reflected radio signal is received via the second antenna relative to a corresponding antenna system that does not actively de-tune the second antenna.

In yet another example, an electronic device comprises a multi-mode antenna system including a first ultra-wide band (UWB) antenna and a second UWB antenna, and a controller configured to in a radio detection and ranging (RADAR) operating mode of the multi-mode antenna system, transmit a radio signal via the first UWB antenna, actively de-tune the second UWB antenna while receiving a reflected radio signal thereby increasing isolation between the first and second UWB antennas, detect a presence of an object based at least on the reflected radio signal received by the second UWB antenna, and based at least on detecting the presence of the object, switching the multi-mode antenna system to operation in a phase difference on arrival (PDOA) operating mode, and in the PDOA operating mode of the multi-mode antenna system, receive, via the first UWB antenna, a first remote radio signal transmitted by a remote antenna of a remote electronic device, receive, via the second UWB antenna, a second remote radio signal transmitted by the remote antenna of the remote electronic device, and determine a position of the remote electronic device based at least on a phase difference between the first remote radio signal received by the first UWB antenna and the second remote radio signal received by the second UWB antenna.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for controlling an electronic device including a multi-mode antenna system including a first antenna and a second antenna, the multi-mode antenna system switchable between a first operating mode and a second operating mode, the method comprising:

in the first operating mode,
  transmitting a radio signal via the first antenna;
  actively de-tuning the second antenna while receiving a reflected radio signal thereby increasing isolation between the first and second antennas;
  detecting a presence of an object based at least on the reflected radio signal received by the second antenna;
  based at least on detecting the presence of the object, switching the multi-mode antenna system to operation in the second operating mode;

in the second operating mode,
  receiving, via the first antenna, a first remote radio signal transmitted by a remote antenna of a remote electronic device;

receiving, via the second antenna, a second remote radio signal transmitted by the remote antenna of the remote electronic device; and determining a position of the remote electronic device based at least on a phase difference between the first remote radio signal received by the first antenna and the second remote radio signal received by the second antenna.

2. The method of claim 1, wherein actively de-tuning the second antenna includes changing an impedance of the second antenna.

3. The method of claim 1, wherein actively de-tuning the second antenna includes adding a resistance to the second antenna.

4. The method of claim 1, wherein the second antenna is actively de-tuned on a time switching basis during a transmission cycle in which the first antenna transmits the radio signal.

5. The method of claim 4, wherein the second antenna is actively de-tuned synchronously with a pulse frequency of the radio signal transmitted by the first antenna.

6. The method of claim 1, wherein the second antenna is actively de-tuned for an entire transmission cycle in which the first antenna transmits the radio signal.

7. The method of claim 1, wherein the first operating mode is a radio detection and ranging (RADAR) mode of operation.

8. The method of claim 1, wherein the second operating mode is a phase difference on arrival (PDOA) mode of operation.

9. An electronic device comprising:
a multi-mode antenna system including a first antenna and a second antenna; and
a controller configured to:
in a first operating mode of the multi-mode antenna system,
transmit a radio signal via the first antenna,
actively de-tune the second antenna while receiving a reflected radio signal thereby increasing isolation between the first and second antennas,
detect a presence of an object based at least on the reflected radio signal received by the second antenna, and
based at least on detecting the presence of the object, switching the multi-mode antenna system to operation in a second operating mode, and
in the second operating mode of the multi-mode antenna system,
receive, via the first antenna, a first remote radio signal transmitted by a remote antenna of a remote electronic device,
receive, via the second antenna, a second remote radio signal transmitted by the remote antenna of the remote electronic device, and
determine a position of the remote electronic device based at least on a phase difference between the first remote radio signal received by the first antenna and the second remote radio signal received by the second antenna.

10. The electronic device of claim 9, wherein actively de-tuning the second antenna includes changing an impedance of the second antenna.

11. The electronic device of claim 9, wherein actively de-tuning the second antenna includes adding a resistance to the second antenna.

12. The electronic device of claim 9, wherein the second antenna is actively de-tuned on a time switching basis during a transmission cycle in which the first antenna transmits the radio signal.

13. The electronic device of claim 12, wherein the second antenna is actively de-tuned synchronously with a pulse frequency of the radio signal transmitted by the first antenna.

14. The electronic device of claim 9, wherein the second antenna is actively de-tuned for an entire transmission cycle in which the first antenna transmits the radio signal.

15. The electronic device of claim 9, wherein the first operating mode is a radio detection and ranging (RADAR) mode of operation.

16. The electronic device of claim 9, wherein the second operating mode is a phase difference on arrival (PDOA) mode of operation.

17. The electronic device of claim 9, wherein the multi-mode antenna system comprises an integrated circuit (IC) module including a printed circuit board (PCB), wherein the first and second antennas are ultra-wide band (UWB) antennas, and wherein the first and second UWB antennas are spaced apart on the PCB by a separation distance that is dependent on the wavelength of the radio signals transmitted by the first and second UWB antennas.

18. The electronic device of claim 9, wherein the controller increases a transmission power at which the radio signal is transmitted via the first antenna relative to a corresponding antenna system that does not actively de-tune the second antenna.

19. The electronic device of claim 9, wherein the controller increases a receiving gain at which the reflected radio signal is received via the second antenna relative to a corresponding antenna system that does not actively de-tune the second antenna.

20. An electronic device comprising:
a multi-mode antenna system including a first ultra-wide band (UWB) antenna and a second UWB antenna; and
a controller configured to:
in a radio detection and ranging (RADAR) operating mode of the multi-mode antenna system,
transmit a radio signal via the first UWB antenna,
actively de-tune the second UWB antenna while receiving a reflected radio signal thereby increasing isolation between the first and second UWB antennas,
detect a presence of an object based at least on the reflected radio signal received by the second UWB antenna, and
based at least on detecting the presence of the object, switching the multi-mode antenna system to operation in a phase difference on arrival (PDOA) operating mode, and
in the PDOA operating mode of the multi-mode antenna system,
receive, via the first UWB antenna, a first remote radio signal transmitted by a remote antenna of a remote electronic device,
receive, via the second UWB antenna, a second remote radio signal transmitted by the remote antenna of the remote electronic device, and
determine a position of the remote electronic device based at least on a phase difference between the first remote radio signal received by the first UWB antenna and the second remote radio signal received by the second UWB antenna.

* * * * *